United States Patent
Iliadis et al.

(10) Patent No.: US 6,744,734 B1
(45) Date of Patent: Jun. 1, 2004

(54) METHOD FOR GENERATING THE OPTIMAL PNNI COMPLEX NODE REPRESENTATIONS FOR RESTRICTIVE COSTS

(75) Inventors: Ilias Iliadis, Rueschlikon (CH); Paolo Scotton, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,951

(22) Filed: Aug. 30, 1999

(30) Foreign Application Priority Data

Sep. 5, 1998 (EP) .............................. 98116791

(51) Int. Cl.[7] .................................. H04J 3/14
(52) U.S. Cl. ...................... 370/238.1; 370/252; 370/254
(58) Field of Search ................. 370/229, 238, 370/238.1, 252, 254; 709/238–242

(56) References Cited

U.S. PATENT DOCUMENTS

| | | | | |
|---|---|---|---|---|
| 5,831,982 A | * | 11/1998 | Hummel | 370/396 |
| 6,115,753 A | * | 9/2000 | Joens | 709/242 |
| 6,141,325 A | * | 10/2000 | Gerstel | 370/238 |
| 6,256,295 B1 | * | 7/2001 | Callon | 370/254 |
| 6,370,119 B1 | * | 4/2002 | Basso et al. | 370/252 |
| 6,385,201 B1 | * | 5/2002 | Iwata | 370/400 |
| 6,456,600 B1 | * | 9/2002 | Rochberger et al. | 370/255 |

FOREIGN PATENT DOCUMENTS

| | | | | |
|---|---|---|---|---|
| EP | 0674459 | | 9/1995 | H04Q/11/04 |
| EP | 0781007 A1 | | 6/1997 | H04L/12/56 |

OTHER PUBLICATIONS

Veeraghavan M et al: "Mobile Location Management in ATM Networks" IEEE Journal on Selected Areas in Communications vol. 15, No. 8, Oct. 1997, pp. 1437–1454, XP000721276.

Iwata A et al: "PNNI Routing Algorithms For Multimedia ATM Internet" NEC Research an Development, vol. 38, No. 1, Jan. 1997, pp. 60–73, XP000694589.

Venkateswaran R. et al: Hierarchical Multicast Routing in ATM Networks: 1996 IEEE International Conference on communications (1CC), Converging Technologies for Tomorrow's Applications Dallas, Jun. 23–27, 1996, vol. 3, Jun. 23, 1996, pp. 1690–1694, XP000625096 Institute of Electrical & Electronics Engineers.

D. Dykeman et al.: "PNNI Draft Specification V 1.0, " af–pnni–0055.000; Chapter 5.10.3: "Topology aggregation" The ATM Forum Private, Mar. 1996, pp. 132–135, XP002095058 ftp.atmforum.com/pub/approved–specs/af–pnni–0055.000.pdf.

Lee W. C.: Topology Aggregation for Hierarchical Routing in ATM Networks: Computer Communications Review, vol. 25, No. 2, Apr. 1, 1995, pp. 82–92, XP000570739.

* cited by examiner

*Primary Examiner*—Seema S. Rao
*Assistant Examiner*—Inder Pal Mehra
(74) *Attorney, Agent, or Firm*—George E. Grosser; Daniel E. McConnell (57) ABSTRACT

A method for constructing the set of optimal complex node representations of a PNNI peer group based on a restrictive cost database (e.g. a cost matrix) associated with the border nodes. The resulting set of complex node representations is the optimal in that it contains all the possible complex node representations that use the minimum possible number of exception bypasses.

21 Claims, 7 Drawing Sheets

Step 1: $C_1 = 3$, $G_1^{(1)} = \{n_1, n_2\}$, $B_{min}\left(G_1^{(1)}\right) = 0$, $R_{min}\left(G_1^{(1)}\right)$:

FIG. 7B

Step 2: $C_2 = 4$, $G_2^{(1)} = \{n_3, n_4\}$, $B_{min}\left(G_2^{(1)}\right) = 0$, $R_{min}\left(G_2^{(1)}\right)$:

$G_2^{(2)} = \{n_5, n_6\}$, $B_{min}\left(G_2^{(2)}\right) = 0$, $R_{min}\left(G_2^{(2)}\right)$:

Step 3: $C_3 = 6$, $G_3^{(1)} = G_2^{(2)} \cup \{n_7\} = \{n_5, n_6, n_7\}$, $B_{min}\left(G_3^{(1)}\right) = \min\{B_{min}\left(G_2^{(2)}\right) + 0, 0 + 1\} = 0$ $R_{min}\left(G_3^{(1)}\right)$:

FIG. 7C

Step 4: $C_4 = 7$, $G_4^{(1)} = G_1^{(1)} \cup G_2^{(1)} = \{n_1, n_2, n_3, n_4\}$, $B_{min}\left(G_4^{(1)}\right) = \min\{B_{min}\left(G_1^{(1)}\right) + 1, B_{min}\left(G_2^{(1)}\right) + 1\} = 1$, $R_{min}\left(G_4^{(1)}\right)$:

FIG. 7D

Step 5: $C_5 = 8$, $G_5^{(1)} = G_3^{(1)} \cup G_4^{(1)} = \{n_1, n_2, n_3, n_4, n_5, n_6, n_7\}$.

$B_{min}(G_5^{(1)}) = \min\{B_{min}(G_3^{(1)}) + \dfrac{4 \cdot (4-1)}{2}, B_{min}(G_4^{(1)}) + \dfrac{3 \cdot (3-1)}{2}\} = \min\{0+6, 1+3\} = 4$ $R_{min}(G_5^{(1)})$:

$(x \leq 3)$

METHOD FOR GENERATING THE OPTIMAL PNNI COMPLEX NODE REPRESENTATIONS FOR RESTRICTIVE COSTS

TECHNICAL FIELD

The invention concerns the computation of PNNI complex node representations and in particular the computation of the set of optimal PNNI complex node representations.

BACKGROUND OF THE INVENTION

For asynchronous transfer mode (ATM) switches to communicate, a standards-based signaling and routing protocol called Private Network-to-Network Interface (PNNI) is used. PNNI is a comprehensive signaling protocol for use in an ATM network and is a comprehensive routing and signaling standard. Among the major characteristics are signaling for switched virtual circuits (SVCs) and dynamic routing capabilities. It also supports the Quality of Service (QoS) parameters. PNNI was approved by the ATM Forum in 1996 and is found in many ATM systems.

PNNI supports a dynamic information exchange to allow switches to update routing paths and to form alternate routes in case of link failure. In order to support bandwidth request and QoS, a local PNNI switch has to know the network topology. Knowing whether the network can support end-to-end QoS (for example the required bandwidth) and whether the path is available are the only ways the local switch can accept a call without compromising the call integrity. Such information can be established manually when the network is formed. However, having to inform every switch on the network when a new switch is added or when the topology changes is very labor intensive and increases the probability of errors. The only effective process is to have the switches exchange information with one another on a regular basis. PNNI requires such an exchange of information as discussed in the next section.

Topology information is exchanged automatically on a regular basis or upon significant changes to ensure that every switch in the network has the most updated view. Switches form peer groups under common ATM prefix. A peer-group-leader (PGL) is elected in each peer group to represent the peer group at the higher layer. The PGL does not have to be the connecting node between two peer groups. An efficient procedure governs the frequency and the scope of information being exchanged so that bandwidth is conserved.

If update information is received by a switch, it is compared with the existing topology information and changes are automatically made. The effect of the information exchange is to increase the ability to reach the destination. By providing rerouting if a commonly used path fails, an alternate path, if available, will be used to reach the destination. Only by having updated topology information can switches be relied on to make such distributed intelligent decisions. To reduce the overall complexity, the amount of needed memory, and the path selection complexity in particular, PNNI uses the hierarchical model for topology aggregation, as indicated above. At various levels of this hierarchy, a PNNI peer group is represented one level up by a single node as for example illustrated in FIG. 1.

PNNI is a hierarchical, link-state routing protocol that organizes switching systems into logical collections called peer groups. Neighboring call establishment in PNNI consists of two operations: the nodes form a peer group by exchanging their peer group identifiers (PGIDs) via Hello packets using a protocol that makes nodes known to each other. If the nodes have the same PGID, they are assumed to belong to the peer group defined by that particular PGID; if their PGIDs are different, they are assumed to belong to different peer groups. A border node has at least one link that crosses the peer group boundary. Hello protocol exchanges occur, over logical links called SVCC-based routing control channels (SVCC-RCC). PNNI defines the creation and distribution of a topology database that describes the elements of the routing domain as seen by a node. This topology database provides all the information required to compute a route from the node to any address that is reachable in or through that routing domain. Nodes exchange database information using PTSEs (PNNI Topology State Elements). PTSEs contain topology characteristics derived from link or node state parameter information. The state parameter information could be either metrics or attributes. PTSEs are grouped to form PTSPs (PNNI Topology State Packets) which are flooded throughout the peer group so that every node in one peer group will have an identical topology database. As mentioned already, every peer group has a node called PGL. There is at most one active PGL per peer group. The PGL will represent the current peer group in the parent peer group as a single node called Logical Group Node (LGN). The LGN will also flood the PTSEs in the parent peer group down to the current peer group. Apart from its specific role in aggregation and distribution of information for maintaining the PNNI hierarchy, the PGL does not have any special role in the peer group.

Call establishment in PNNI consists of two operations: the selection of an optimal path and the setup of the connection state at each point along that path. To provide good accuracy in choosing optimal paths in a PNNI network, the PNNI standard provides a way to represent a peer group with a structure which is more sophisticated than the single node. This representation is called "complex node representation" (see right hand side of FIG. 2). It allows advertisement of the cost of traversing this node and therefore the cost of traversing the whole peer group summarized it by the respective complex node representation.

The computation of complex node representations and the aggregation and distribution of information for maintaining identical databases within a peer group and between peer groups is very complex and time consuming in particular when dealing with large networks. In other words, the path calculation becomes slower with increasing size of a network and as topology updates use up more and more of the node's and link's capacity.

It is an object of the present invention to provide a fast and reliable method for calculating complex node representations using the minimum possible number of exception bypasses.

It is another object of the present invention to provide method for path computation based on a fast and reliable calculation of complex node representations using the minimum possible number of exception bypasses.

It is a further object to provide improved PNNI nodes and PNNI networks.

SUMMARY OF THE INVENTION

The present invention concerns a scheme to construct the set of optimal complex node representations of a PNNI peer group based on a restrictive cost database (e.g. a cost matrix) associated with the border nodes. The resulting set of complex node representations is the optimal in that it contains all the possible complex node representations that use the minimum possible number of exception bypasses.

The present scheme can be employed in any kind of network devices, such a routers for example. The scheme can also be used for routing a packet or frame through a PNNI network using an optimal path. It can also be used for the computation of the optimal path between border nodes of a PNNI peer group.

The advantages of the present invention are addressed in the detailed description.

DESCRIPTION OF THE DRAWINGS

The invention is described in detail below with reference to the following schematic drawings.

DESCRIPTION OF PREFERRED EMBODIMENTS

The basic concept of the present invention is described in the following. Before addressing different embodiments, relevant terms and expressions are defined and explained.

The expression "restrictive cost" is used to describe the cost as a function of the bandwidth of a link. The restrictive cost C can be defined as C=M−bandwidth or as C=1/bandwidth, for example. According to the definition of restrictive cost, the weakest link of a path defines the cost. The opposite of restrictive costs are additive costs which depend for example on the delays of links.

The words "node", or "vertex", or "network device" are used as generic term for routers, is switches, bridges, brouters, and any other system that transmits or receives information.

The word "database" is used to describe tables, listings, or any other collection of data. Such a database can either be located within one and the same memory or can be distributed.

The term "exception bypass" represents connectivity between two ports (i.e., a bypass) that is significantly better (less costly) than that implied by traversing a nucleus a complex node representation.

The optimality criterion: find the set of complex node representations with the minimum number of exception bypasses. This set is called the optimal one. Given a restrictive cost matrix, the present method provides the set of complex node representations that use the minimum number of exception bypasses. It is therefore the optimal one. A network can be modeled by an oriented graph. The following conventions will be used:

A node of the network will be referenced as a vertex of the graph.

A link between two network nodes will be referenced as an edge between two vertices of the graph.

Let G(V, E) be the graph representing the network at a given point in time. V is a set of vertices and E a set of directed edges. Therefore, for all $v_i, v_j \epsilon V$ if $v_i$ and $v_j$ are connected, the edge $v_i \to \epsilon v_i, v_j \epsilon E$. Let v and v be two vertices of graph G(V, E). The path $v_x \to P_{x,y} v_y$ is a sequence of n vertices such that:

$$\left\{ \begin{array}{c} P_0 = v_x \\ P_{n-1} = v_y \\ \exists \epsilon \quad \epsilon E \ \forall \ i \epsilon \ `0, \ldots, n-2` \end{array} \right\}$$

If the path does not exist, $P_{x,y} = \{\emptyset\}$. In this case the path is said to be not feasible. The length of the path $L(P_{x,y})$ is the number of edges in the path:

$$L(P_{x,y}) \left\{ \begin{array}{c} card(P_{x,y}) - 1 \text{ if } P_{x,y} \neq \{\emptyset\} \\ 0 \text{ otherwise.} \end{array} \right\}$$

Let us associate a restrictive cost to an edge. For an edge $\epsilon v_p v_j \epsilon E$, such a cost will be $C_r(\epsilon v_i, v_j)\epsilon$. (To be more general one could consider that $C_r(\epsilon v_i, v_j)\epsilon^+$. However, since the PNNI protocol allows only integer representations, in the following only integer values will be considered. It is to be noted, however, that the present invention can also be applied to non-integer costs. The cost is said to be restrictive since the restrictive cost of a path will be the maximum of the restrictive costs of the traversed edges. Therefore for a feasible path from v to v of length n, $P_{x,y}$, the restrictive cost of such a path will be:

$$C_r(P_{x,y}) = \max_{i \epsilon [0,n[} \{C_r(\epsilon_{P_i, P_{i+1}})\}.$$

If the path is not feasible, then $C_r(P_{x,y}) = \infty$. It is possible to the define the restrictive cost of an edge in both directions: $C_r^f(Pv_i, v_j) = C_r(\epsilon v_i, v_j)$ and $C_r^r(Pv_i, v_j) = C_r(\epsilon v_j, v_i)$. At path level:

$$C_r^f(P_{x,y}) = \max_{i \epsilon [0,n[} \{C_r(\epsilon_{P_i, P_{i+1}})\} \text{ and, } C_r^r(P_{x,y}) = \max_{i \epsilon [0,n[} \{C_r(\epsilon_{P_{i+1}, P_i})\}$$

Of course, if the path is not feasible, $C_r^f(P_{x,y}) \ C_r^r(P_{x,y}) = \infty$. When computing optimal path, it is sometimes sufficient to minimize a "symmetric" cost. That is, only one cost is associated to a path regardless the direction. In the case of directed edges, this requires a symmetrization step. Therefore for all edges $\epsilon v_i$, of the graph a symmetric restrictive cost is considered:

$$C_r^s(\epsilon v_i, v_j) =$$

The extension to the path cost is straightforward.

$$C_r^s(P_{x,y}) = \max_{i \epsilon [0,n[} \{C_r^s(\epsilon_{P_i, P_{i+1}})\}$$

There are many different ways to compute a database of cost entries (e.g. a cost matrix) for a given PNNI peer group or area. An example of how to quickly and reliably compute the restrictive cost between pairs of border nodes of a PNNI peer group is addressed in copending European patent application with serial number 98114966.9 and title "IMPROVED PNNI TOPOLOGY ABSTRACTION", currently assigned to the assignee of the present application. A schematic representation of a cost matrix $M_N(C)$ is shown later.

Problem Solved by the Present Invention

Figure 1:
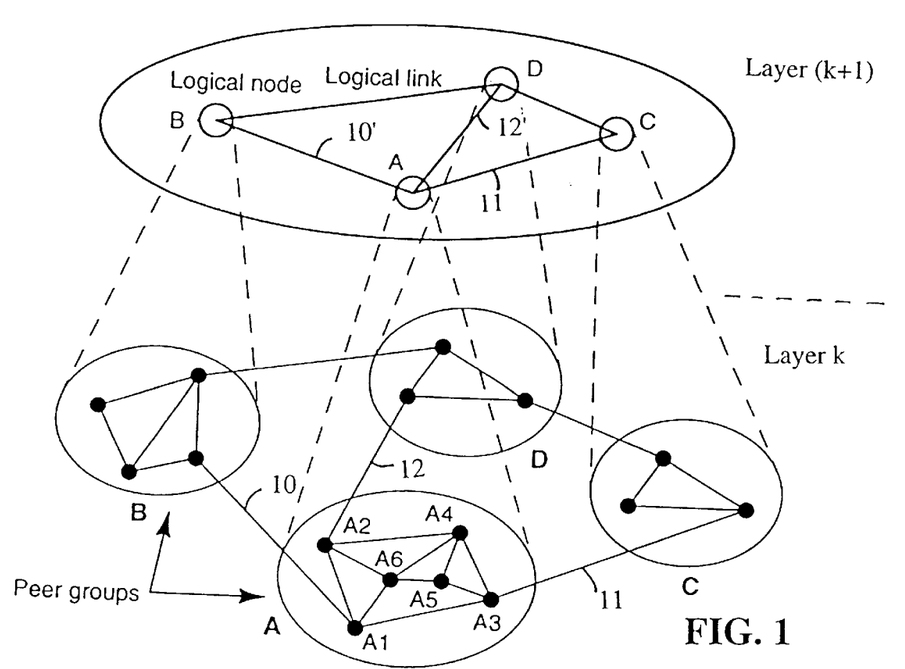
FIG. 1 is a schematic representation of a PNNI network used to explain various aspects of a PNNI network.

The PNNI hierarchy is used to represent a whole PNNI group as a single node. This allows the abstraction of network topology, and, therefore, the path computation complexity is alleviated. Layer-k nodes (A, B, C, D) are clustered to form layer-(k+1) nodes, as shown in FIG. 1. The PNNI peer group A at layer k is composed of six nodes (A1–A6). Three of them (A1, A2, and A3) have a special role since each of them has a link 10, 11, and 12 connecting peer group A to the other peer groups B, C and D (outside links). Those nodes (A1, A2, and A4) are called border nodes. When the topology is abstracted at layer-(k+1), the peer group A is represented only by node A. The outside links 10, 11, and 12 are also shown at layer k+1. At layer-(k+1) these outside links are shown as 10', 11', and 12'.

Figure 2:
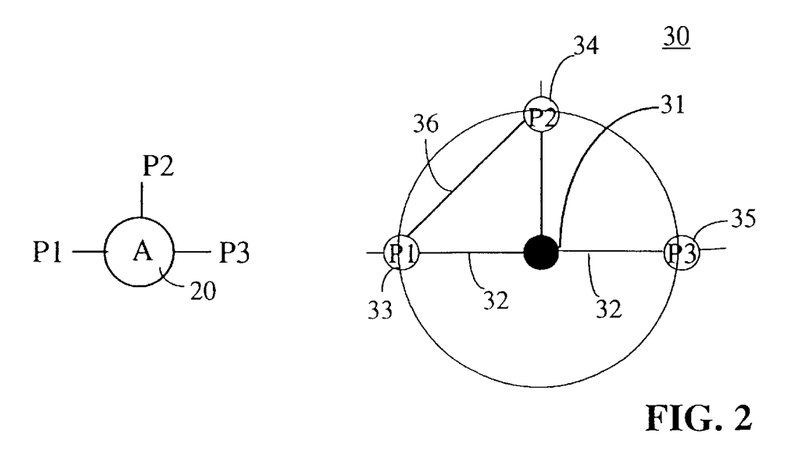
FIG. 2 are two different forms of representations used in connection with PNNI.

Referring to FIG. 2, the PNNI routing protocol authorizes two ways of representing a PNNI peer group at an upper layer:

As a simple node 20. This representation is simple to construct and to use. However, it does not show the cost of traversing the peer group.

As a complex node 30. This complex node representation shows the cost of traversing the peer group. It is therefore possible to take into account this cost at path selection (computation) time. The drawbacks are of course increased complexity to generate this complex node representation as well as to use it when computing routes (in this case there are more vertices and edges than in the case of simple node representation).

The principle of the complex node representation is to map the simple node to a representation where:

The nucleus 31 is a vertex representing the node itself

The nucleus 31 is connected via spokes 32 to a set of vertices 33, 34, and 35 each one representing a port (P1, P2, P3) in the simple node representation.

Optionally, vertices representing ports can be directly connected by exception bypasses. In the present example vertices 33 and 34 are connected by an exception bypass 36.

The problem is how to generate a complex node representation corresponding to a given PNNI peer group. This complex node representation can be built for various kind of costs. Asymmetric. costs versus symmetric costs can also be considered. In the present context, only symmetric restrictive costs are considered. Note that spokes 32 and exception bypasses 36 are actually normal edges belonging to the network topology graph. Consequently, the path computation time is closely related to the density of the complex node representation. In order to minimize the path computation time, it is, therefore, crucial to find a method for creating complex node representations with as few edges as possible. This method is presented in the section with title "Method for generating the set of optimal complex node representations".

In the following, a PNNI peer group containing N border nodes is considered wherein $M_N(C)$ is the associated cost matrix summarizing the cost of traversing the peer group between each pair of border nodes.

$$M_N(C) = \begin{bmatrix} 0 & c_{1,2} & \cdots & c_{1,N} \\ c_{2,1} & 0 & \cdots & . \\ \vdots & \vdots & \vdots & \vdots \\ . & . & 0 & c \end{bmatrix}$$

Because of the cost symmetry, this matrix $M_N(C)$ is symmetric.

Complex Node Representations

Figure 3:
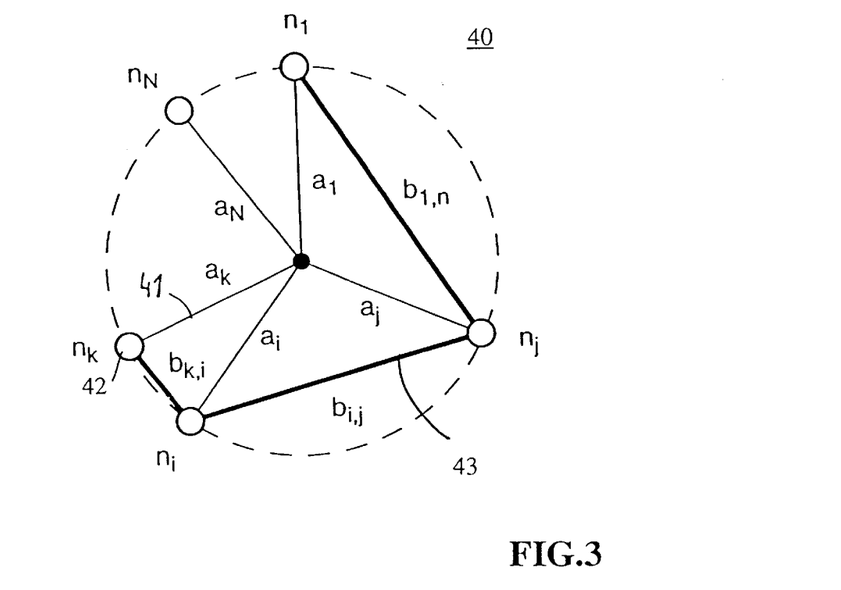
FIG. 3 is a schematic complex node representation.

Referring to FIG. 3, let $R(M_N(C))$ be a complex node representation 40 corresponding to the matrix $M_N(C)$. Let $a_k$ denote the cost of the spoke 41 associated with the node $n_k$ 42, and $b_{i,j}$ denote the cost of the bypass 43 associated with the pair of nodes $(n_i, n_j)$ Then it holds that $c_{i,j}=\min(b_{i,j}, \max(a_i,a_j))$, $\forall i,j$ ($1 \leq i \neq j \leq N$) with $b_{i,j}=\infty$ for all pairs of nodes $(n_i, n_j)$ for which there is no exception bypass. Let $B(R)$ denote the number of exception bypasses used by the complex node representation R.

Note that there may be several complex node representations corresponding to a given cost matrix. One complex node representation, for example, could be the following:

$$R_{max}: a_i=\infty \forall i(1 \leq i \leq N) \text{ and } b_{i,j}=c_{i,j}, \forall i,j(1 \leq i \neq j \leq N).$$

This representation uses exception bypasses for all pair of nodes. Consequently, the number of exception bypasses used is the maximum possible and it is equal to $B(R_{max})=N(N-1)/2$. The drawback of this approach is the increased path selection (computation) algorithm complexity reflected by the number of exception bypasses. Our aim is to obtain the set of complex node representations with a reduced number of exception bypasses. It turns out that the structure of an optimal complex node representation is tightly coupled with the group evolution process related to the cost matrix. This issue is addressed in the next sections.

Group Evolution

Let $c_{min}(c_{max})$ be the minimum(maximum) cost corresponding to the matrix $M_N(C)$. Note that the diagonal elements have the value zero and are not taken into consideration (i.e., the diagonal is excluded). Formally, $$c_{min} = \min_{\forall (i,j)}\{c_{i,j}\}, c_{max} = \max_{\forall (i,j)}\{c_{i,j}\}.$$

Let F be the number of different cost entries contained in matrix $M_N(C)$ sorted in an increasing order:

$$c_{min}C_1 < C_2 < \ldots < C_k < \ldots < C_F = c_{max}$$

Figure 4A:
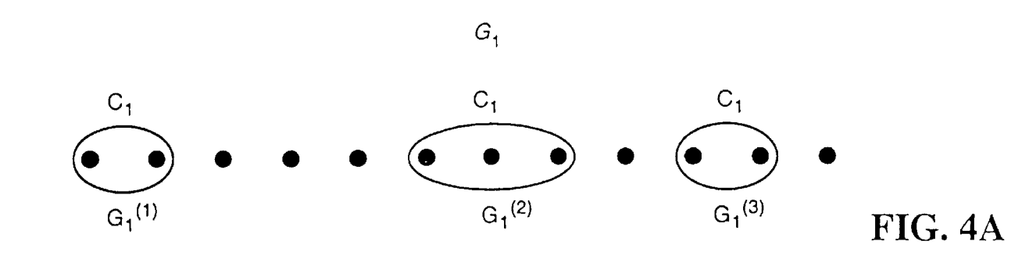
FIGS. 4A–4C are schematic representations of the group evolution process, in accordance with the present invention.
Figure 4B:
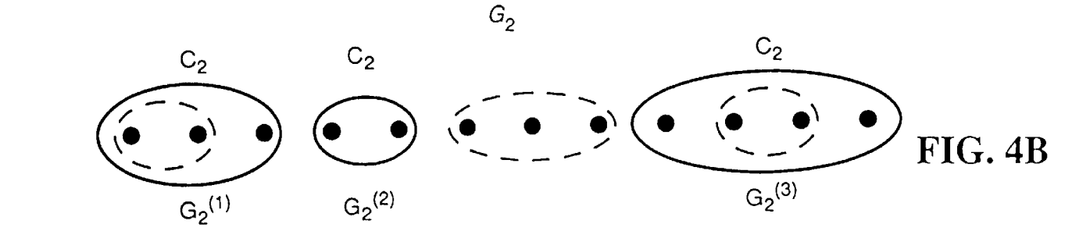

Let us consider the set of node pairs $(n_i, n_j)$ for which the associated cost is equal to $C_1$. These nodes can be organized in logical groups, as is schematically shown in FIG. 4A, with the property that the cost of any pair of nodes of any of these logical groups is equal to $C_1$. Let $G_1$ be the set of these logical groups denoted by $G_1(1), \ldots, G_1(g1)$. FIG. 4A depicts three such logical groups ($g_1=3$); groups $G_1(1)$ and $G_1(3)$, contain two nodes whereas group $G_1(2)$, contains three nodes. In the case of restrictive costs, it turns out that the cost between any of the nodes belonging to a particular logical group and another node outside of this particular logical group is the same, i.e. all nodes of one group have the same Property. It is important to note that the cost between any of the nodes belonging to the set of groups $G_1$ and another node outside $G_1$ is at least equal to $C_2$. This allows us to merge all the nodes of a logical group.to one entity and, subsequently, apply the same procedure based on cost $C_2$, as shown in FIG. 4B. Please note that the cost between any of the nodes belonging to the set of groups $G_2$ and another node outside $G_2$ is at least equal to $C_3$.

Figure 4C:
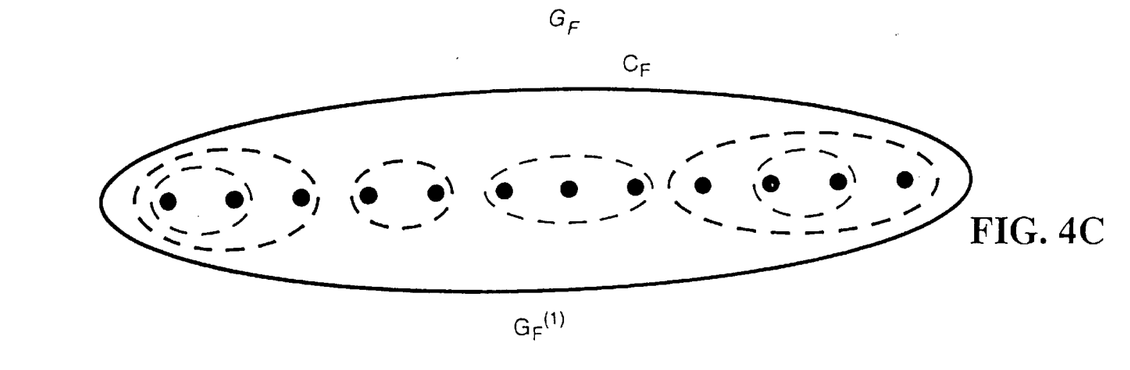

Applying this procedure successively k times, the set $G_k$ of logical groups $G_k(1), \ldots, G_k(g_k)$ corresponding to the cost $C_k$ is obtained. Finally, applying the procedure on $C_F$, the final logical group $G_F(1)$ containing all the nodes is obtained, as depicted in FIG. 4C. This final logical group $G_F(1)$ is herein referred to as logical group representation of a PNNI peer group. The logical group representation contains all the logical groups $G_1(1), \ldots, G_1(g_1), \ldots, G_2(1), \ldots, G_2(g_2), \ldots, G_n(1), \ldots, G_k(g_k), \ldots, G_F(1)$ for which the Property holds.

The previously described procedure derives the logical group representation by considering the list of cost entries sorted in an increasing order. Note, however, that the same logical group representation can be obtained by considering the list of cost entries sorted in a decreasing order or any other order.

Optimal Complex Node Representation

Let $S_R$ be the set of all possible complex node representations R associated with the cost matrix $M_N(C)$. Our aim is to find the set $S_R$ of the representations $R_{min}$ that use the minimum possible number of exception bypasses, as well as to determine this number denoted by $B_{min}$. Thus $$B\min = \min_{R \in S}\{B(R)\},$$

and $B(R_{min}) = B_{mi}$
Obviously, $$0 \leq B_{min} \leq B(R_{max}) = \frac{N(N-1)}{2}.$$

Figure 5:
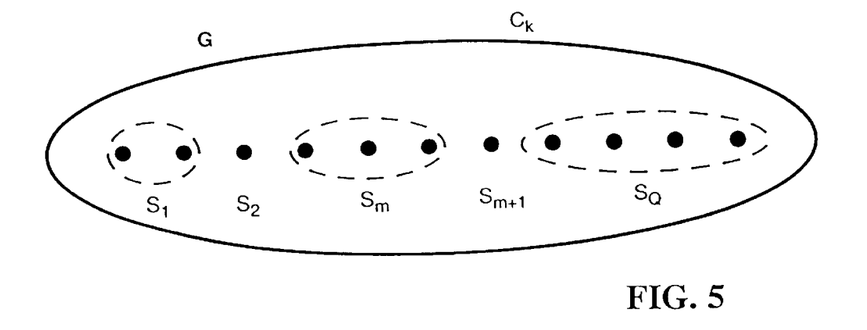
FIG. 5 is a logical group representation of a PNNI peer group, in accordance with the present invention.

It turns out that the structure of the optimal complex node representations, is tightly coupled with the group evolution process. Let us consider the k-th iteration of the process in which logical groups corresponding to the cost $C_k$ are formed. Let us focus on one typical logical group G belonging to the set $G_k$, and let us assume that it contains the logical groups $S_1, \ldots, S_m, \ldots, S_Q$, as shown in FIG. 5. It turns out that, in order to obtain the set of optimal complex node representations of G, the knowledge of the optimal complex node representations of the logical groups $S_1, \ldots, S_m, \ldots, S_Q$ is required.

In the following some definitions are introduced:

$R_{min}(G)$: an optimal complex node representation corresponding to the nodes contained in G, $B_{min}(G)$: the number of exception bypasses used in $R_{min}(G)$, $|S_m|$: the number of nodes contained in $S_m$, $R_{min}(S_m)$: an optimal complex node representation corresponding to the nodes contained in $S_m$, $B_{min}(S_m)$: the number of exception bypasses used in $R_{min}(S_m)$.

In order to obtain the optimal set of complex node representations $R_{min}(G)$, the quantities $R_{min}(S_m)$ and $B_{min}(S_m)$ of every logical (sub)group $(S_1, \ldots, S_m, \ldots, S_Q)$ should be known.

Algorithm for Deriving the set of the Optimal Complex Node Representations $R_{min}(G)$ a. The minimum number of exception bypasses corresponding to the optimal set of complex node representations is given by $$B_{min}(G) = \min_{1 \leq j \leq Q}\left\{B_{min}(S_j) + \sum_{i=1,i \neq j}^{Q} \frac{|S_i| \cdot (|S_i|-1)}{2}\right\}.$$

b. Let $S_m$ be a logical group (there exists at least one such group) that satisfies the following relation, $$B_{min}(S_m) + \sum_{i=1,i \neq m}^{Q} \frac{|S_i| \cdot (|S_i|-1)}{2} = B_{min}(G).$$

c. Set the cost of the spokes of the nodes contained in the remaining Q−1 logical groups $S_1, \ldots, S_{m-1}, S_{m+1}, \ldots, S_Q$, equal to $C_k$.

d. Connect every pair of nodes $(n_i, n_j)$ belonging to any of the above Q−1 logical groups by an exception bypass with cost $b_{\{i,j\}} = c_{\{i,j\}}$.

e. Transfer the optimal complex node representation of the logical group $S_m$ on the corresponding part of $R_{min}(G)$, including spokes and bypasses.

Method for Generating the set of Optimal Complex Node Representations

The set of optimal complex node representations corresponding to the cost matrix $M_N(C)$ can be obtained as follows. Starting at the lowest level, we follow the group evolution process based on the sorted cost entries $c_{min} = C_1 < C_2 < \ldots < C_k < \ldots < C_F = c_{max}$. At a typical step k, the node groups $G_k(1), \ldots, G_k(Gk)$ related to the cost $C_k$ are identified, and the corresponding set of optimal complex node representations is constructed by applying the above algorithm. At the final step, the set of optimal complex node representations sought is obtained, corresponding to the last group (herein referred to as logical group representation) that contains all the nodes.

Please note that the cost entries can be sorted either in a list sorted by increasing or decreasing costs. There are different ways to sort cost entries. A simple example is where the cost entries (records) are actually ordered by their cost C in a register or database such that the matrix entry with the lowest value comes first and the matrix entry with the highest value is at the end of the list. It is obvious that there are other ways to represent this information. One example is a logical sorted list. In this case the actual cost entries (records) in the list are not ordered by cost. Pointers are used instead. Such a logical sorted list can be easily updated because only pointers need to be changed.

Numerical Example

Let us consider the following cost matrix $M_7(C)$:

$$M_7(C) = \begin{array}{c|ccccccc} & 1 & 2 & 3 & 4 & 5 & 6 & 7 \\ \hline 1 & 0 & 3 & 7 & 7 & 8 & 8 & 8 \\ 2 & 3 & 0 & 7 & 7 & 8 & 8 & 8 \\ 3 & 7 & 7 & 0 & 4 & 8 & 8 & 8 \\ 4 & 7 & 7 & 4 & 0 & 8 & 8 & 8 \\ 5 & 8 & 8 & 8 & 8 & 0 & 4 & 6 \\ 6 & 8 & 8 & 8 & 8 & 4 & 0 & 6 \end{array}$$

Figure 6:
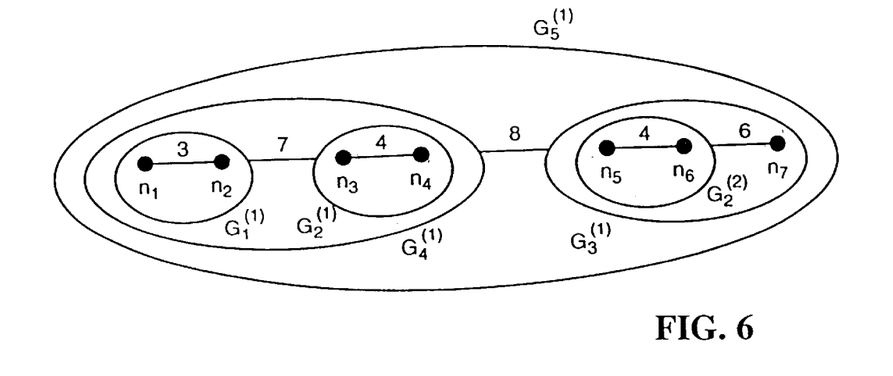
FIG. 6 is a logical group representation used to illustrate the group evolution, in accordance with the present invention.
Figure 7A:
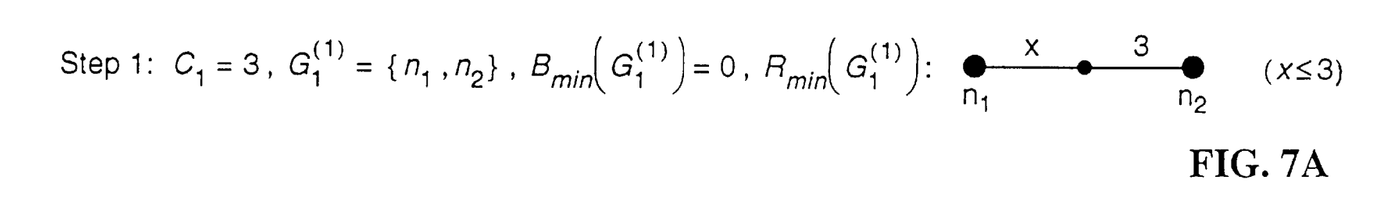
FIGS. 7A–7E are schematic representations of the step-by-step application of the method for generating the set of optimal complex node representations, in accordance with the present invention.
Figure 7B:
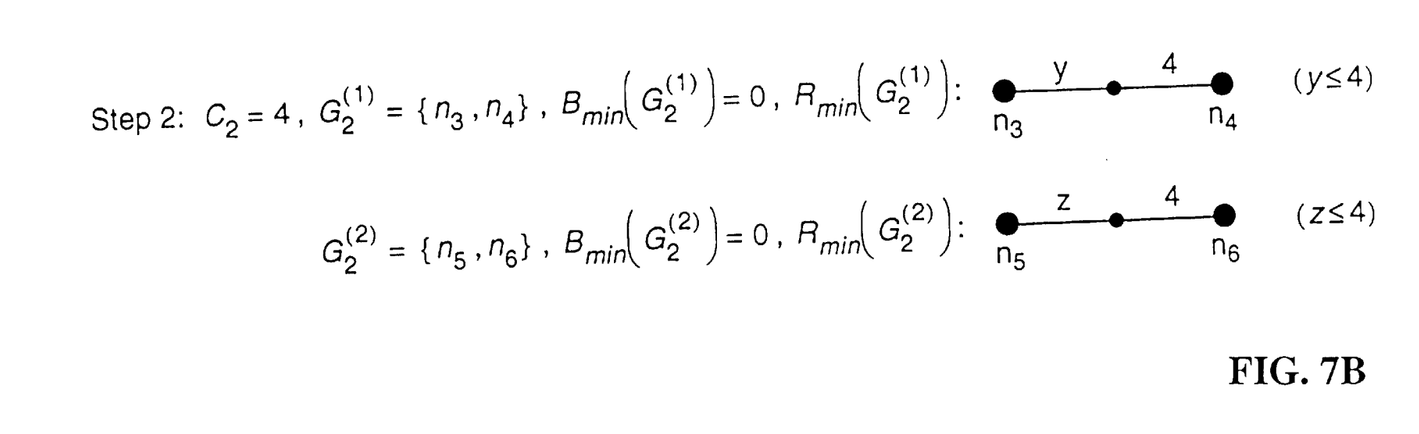
Figure 7C:
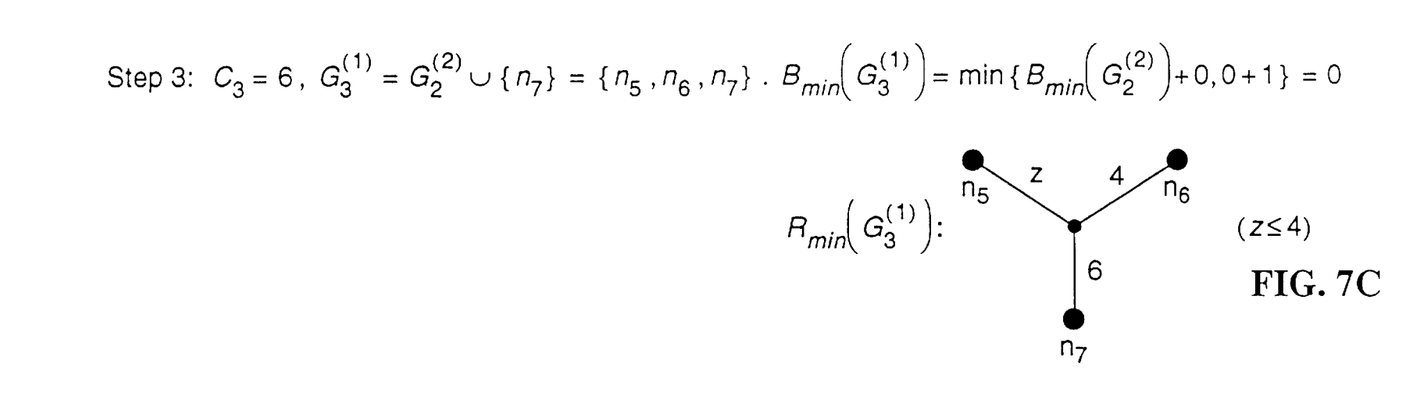
Figure 7D:
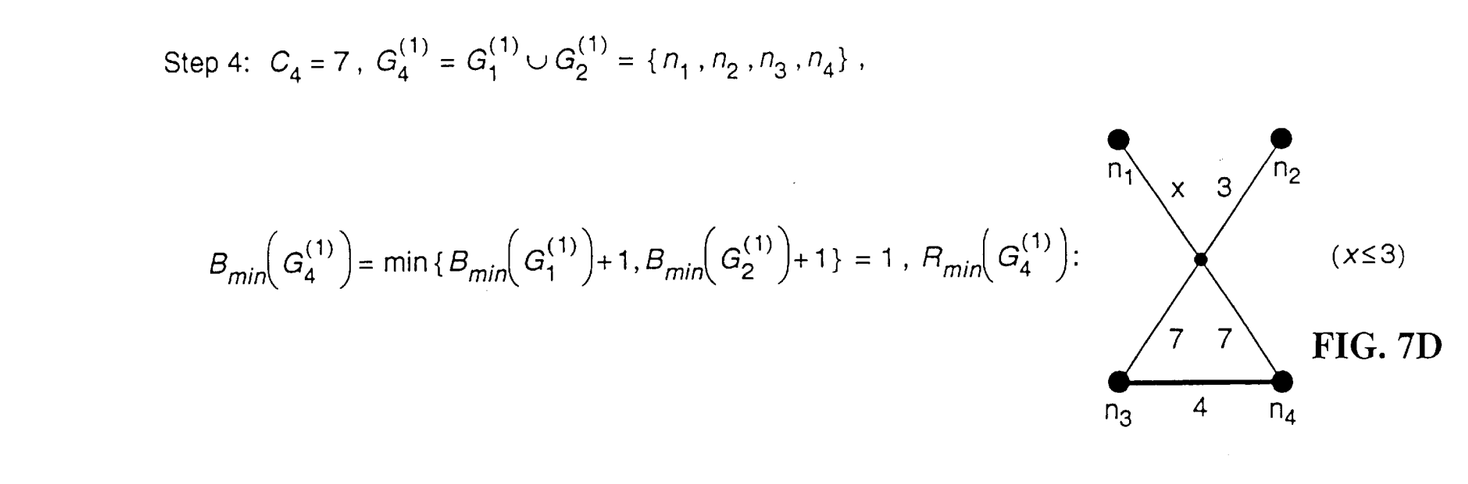
Figure 7E:
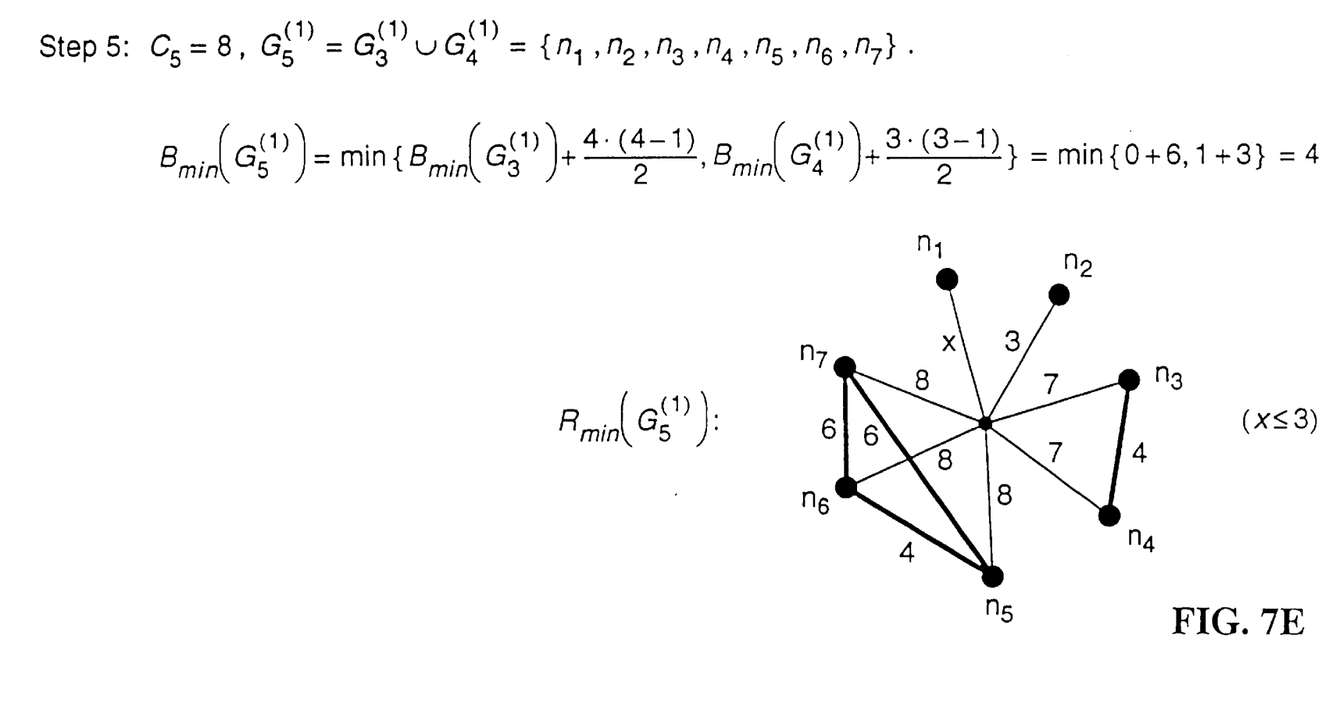

In this case one has: $c_{min} = C_1 = 3$, $C_2 = 4$, $C_3 = 6$, $C_4 = 7$, and $c_{max} = C_5 = 8$. The group evolution is explained in connection with FIG. 6.

Next, we apply the method described in the section entitled "Method for generating the set of optimal complex node representations". At each step, the relevant node groups are identified and the corresponding optimal complex node representations are constructed. The step-by-step application of the method is illustrated in FIGS. 7A–7E. On the left hand side of these Figures the formation of logical groups is indicated whereas on the right hand side of these Figures the corresponding optimal complex node representations are shown. The final set of optimal complex node representations is shown on the right hand side of FIG. 7E.

Further Aspects of the Present Invention

Depending on the application, the inventive scheme might be employed in one node of a network, domain, or peer group and the result is flooded to other nodes in the peer group. Likewise, each node might compute the set of optimal complex node representations independently of the other nodes.

Figure 8:
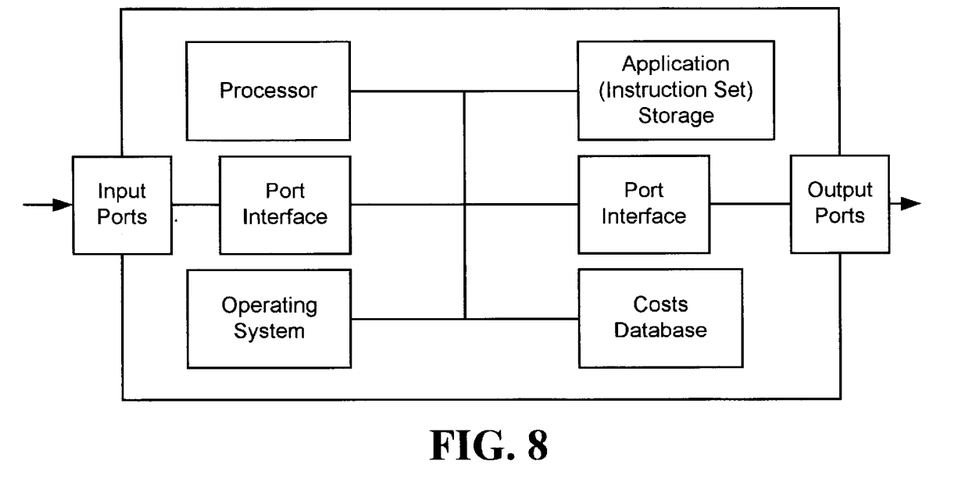
FIG. 8 is a block diagram of the hardware and software components of a network device in which the present invention may be implemented.

The present scheme might be implemented in any kind of network device, such as routers, switches, bridges, brouters, and any other system that transmits or receives information. Such a network device, shown in block diagram form in FIG. 8, typically includes a programmable processor. A stored instruction set or program provides instructions which are executed by the processor for computation of an optimal complex node representation of a PNNI peer group The network device furthermore comprises a database with cost entries describing the restrictive cost between all pairs of border nodes of the PNNI peer group. The database might hold a matrix, for example. The optimal complex node representation of a PNNI peer group is now computed within the network device by considering the cost entries, to obtain a logical group representation with nested logical groups which have the property that the cost between any of the border nodes belonging to a particular logical group of the nested logical groups and another border node outside this particular logical group is the same. Then, an optimal complex node representation for each logical group of the nested logical groups starting from the logical group with lowest cost might be constructed and the optimal complex node representation of a PNNI peer group is derived from the complex node representations.

A network device, according to the present invention, might also include a port for connection to a link and an interface for transmitting the optimal complex node representation, computed according to the present invention, through the port onto said link. The network device might also include a port and interface for receiving an optimal complex node representation, computed according to the present invention, from another network device. The port and interface might be used to broadcast the optimal complex node representation.

A network device, according to the present invention, might furthermore include means for the computation of an optimal path between two border nodes of the PNNI peer group. Usually, these means are implemented in form of an instruction set with instructions which are executed by the network device's processor. Any path computation algorithm can be used to derive the optimal path from the optimal complex node representation of the respective PNNI peer group.

An improved PNNI network or PNNI peer group can be built using at least one of the above described network devices.

The set of optimal complex node representations, according to the present invention, can be used to calculate an optimal path from a source node to a destination node. The computation of the present optimal complex node representation is unique and the path computation is fast because there are fewer edges to be considered. The optimal path can be computed by considering the cost entries of a cost matrix to obtain a logical group representation with nested logical groups which have the property that the cost between any of the border nodes belonging to a particular logical group of the nested logical groups and another border node outside this particular logical group is the same. Then, an optimal complex node representation for each logical group of the nested logical groups starting from the logical group with lowest cost might be constructed. The optimal complex node representation of the respective PNNI peer group can be derived from the complex node representations of the nested logical groups. In a next step, one then can derive the optimal path from the optimal complex node representation of the respective PNNI peer group. Any path computation algorithm can be used to derive the optimal path from the optimal complex node representation of the respective PNNI peer group.

The set of optimal complex node representations can be recalculated from time-to-time, e.g. if a link changes or is added, or more generally when the matrix changes.

Having the minimal number of exception bypasses provides two major advantages:

It speeds up significantly path computation;

It provides a more compact representation, so there is less data to be transmitted over the network (i.e. less bandwidth is consumed);

Since the optimal complex node representation has less bypasses than any other representations less memory is needed in a node.

What is claimed is:

1. Method for generating an optimal complex node representation of a PNNI peer group, said peer group comprising nodes and links connecting pairs of nodes, some of the nodes being border nodes, and further comprising a database with cost entries describing the restrictive cost between all pairs of border nodes, the method comprising the steps:

a. considering the cost entries in order to obtain a logical group representation with nested logical groups having the property that the cost between any of the border nodes belonging to a particular logical group of the nested logical groups and another border node outside this particular group is the same and where the logical group representation is the same irrespective of the order in which the cost entries are considered, b. constructing an optimal complex node representation for each logical group of the nested logical groups starting from the logical group with lowest cost, c. deriving said optimal complex node representation of a PNNI peer group from the complex node representations constructed in step b.

2. The method of claim 1, whereby the cost entries are sorted in an increasing or decreasing order prior to carrying out step a.

3. The method of claim 1, whereby the cost entries are considered in step a. in an increasing order such that one or more logical groups are defined and then nested in a subsequent logical group until the logical group representation is obtained.

4. The method of claim 3, whereby the optimal complex node representation for each logical group is constructed right after the respective logical group has been defined.

5. The method of claim 3, whereby step b. is carried out in parallel to step a.

6. The method of claim 1, whereby step a. comprises the following steps to define a logical group of the nested logical groups:

i. taking a particular cost entry from the database with cost entries, ii. selecting all pairs of border nodes which are connected by a cost entry equal to the particular cost entry, iii. grouping all pairs of border nodes which were selected in step ii. to define the logical group.

7. Method for generating an optimal complex node representation of a PNNI peer group, said peer group comprising nodes and links connecting pairs of nodes, some of the nodes being border nodes, and further comprising a database with cost entries describing the restrictive cost between all pairs of border nodes, the method comprising the steps:

a. considering the cost entries in order to obtain a logical group representation with nested logical groups having the property that the cost between any of the border nodes belonging to a particular logical group of the nested logical groups and another border node outside this particular group is the same and where the database is a symmetrical n×n cost matrix if there are n border nodes in the PNNI peer group, b. constructing an optimal complex node representation for each logical group of the nested logical groups starting from the logical group with lowest cost, c. deriving said optimal complex node representation of a PNNI peer group form the complex node representations constructed in step b.

8. The method of claim 1, whereby the cost is a restrictive cost.

9. The method of claim 1, whereby the database with cost entries is computed prior to carrying out step a.

10. The method of claim 1, whereby a set of optimal complex node representations is generated.

11. The method of claim 1, whereby step a. is a group evolution process.

12. Method for generating an optimal complex node representation of a PNNI peer group, said peer group comprising nodes and links connecting pairs of nodes, some of the nodes being border nodes, and further comprising a database with cost entries describing the restrictive cost between all pairs of border nodes, the method comprising the steps:

a. considering the cost entries order to obtain a logical group representation with nested logical groups having the property that the cost between any of the border nodes belonging to a particular logical group of the nested logical groups and another border node outside this particular group is the same, and where the cost between any of the border nodes belonging to a particular logical group of the nested logical groups and another border node outside this particular logical group is greater than the cost between pairs of border nodes within this particular logical group, b. constructing an optimal complex node representation for each logical group of the nested logical groups starting from the logical group with lowest cost, c. deriving said optimal complex node representation of a PNNI peer group form the complex node representations constructed in step b.

13. Method for the computation of an optimal pith between two border nodes of a PNNI peer group, said peer group comprising nodes and links connecting pairs of nodes, some of the nodes being border nodes, and further comprising a database with cost entries describing the restrictive, cost between all pairs of border nodes, the method comprising the steps:

a. considering the cost entries to obtain a logical group representation with nested logical groups having the property that the cost between any of the border nodes belonging to a particular logical group of the nested logical groups and another border node outside this particular logical group is the same, and where the logical group representation is the same irrespective of the order in which the cost entries are considered, b. Constructing an optimal complex node representation for each logical group of the nested logical groups starting with the logical group with lowest cost, c. deriving said optimal complex node representation of a PNNI peer group from the complex node representations constructed in step b, and d. deriving the optimal path from said optimal complex node representations of a PNNI peer group.

14. The method of claim 13, whereby in step d. a path computation algorithm is used to derive the optimal path.

15. Network device for use in a PNNI network, said device comprising a processor, instructions, being executed by the processor, for the computation of an optimal complex node representation of a PNNI peer group being part of the PNNI network, said PNNI peer group comprising nodes and links connecting pairs of nodes, some of the nodes being border nodes, and a database with cost entities describing the restrictive cost between all pairs of border nodes of said PNNI peer group, said computation comprising the following steps:

a. considering the cost entries to obtain a logical group representation with nested logical groups having the property that the cost between any of the border nodes belonging to a particular logical group of the nested logical groups and another border node outside this particular logical group is the same, and where the logical group representation is the same irrespective of the order in which the cost entries are considered, b. constructing an optimal complex node representation for each logical group of the nested logical groups starting from the logical group with the lowest cost, and c deriving sad optimal complex node representation of a PNNI peer group from the complex node representations constructed in step b.

16. The network device of claim 15 comprising a port for connection to a link and an interface for transmitting said optimal complex node representation through said port onto said link.

17. The network device of claim 15 comprising a port for connection to a link and an interface for receiving an optimal complex node representation from another network device via said link.

18. The network device of claim 15 comprising an instruction set for the computation of an optimal path between two border nodes of the PNNI peer group.

19. PNNI network comprising PNNI peer group having nodes and links connecting pairs of nodes, some of the nodes being border nodes, wherein on border node comprises:

a processor, instructions, being executed by the processor, for computation of an optimal complex node representation of the PNNI peer group, and a database with cost entries describing the restrictive cost between all pairs of border nodes of said PNNI peer group, said computation comprising the following steps, a. considering the cost entries to obtain a logical group representation with nested logical groups having the property that the cost between any of the border nodes belonging to a particular logical group of the nested logical groups and another border node outside this particular logical group is the same, and where the logical group representation is the same irrespective of the order in which the cost entries are considered, b. constructing an optimal complex node representation for each logical group of the nested logical groups starting from the logical group with lowest cost, c. deriving said optimal complex node representation of a PNNI peer group from the complex node representations constructed in step b.

20. The PNNI network of claim 19, wherein said optimal complex node representation is transmitted from said one border node to other border nodes within the PNNI peer group.

21. The PNNI network of claim 19 comprising means for the computation of an optimal path between two border nodes of the PNNI peer group.

* * * * *